May 8, 1951      R. E. PARKS      2,551,699
BEVERAGE MIXING DEVICE
Filed Dec. 31, 1947
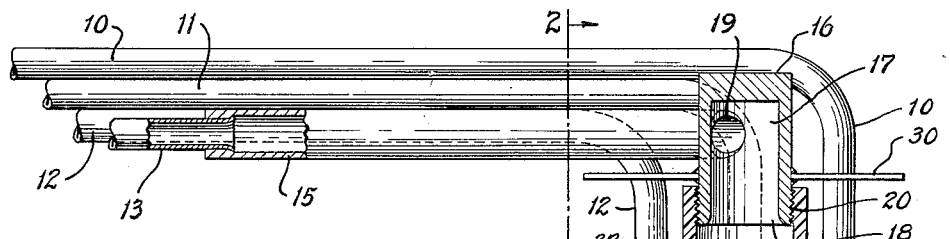
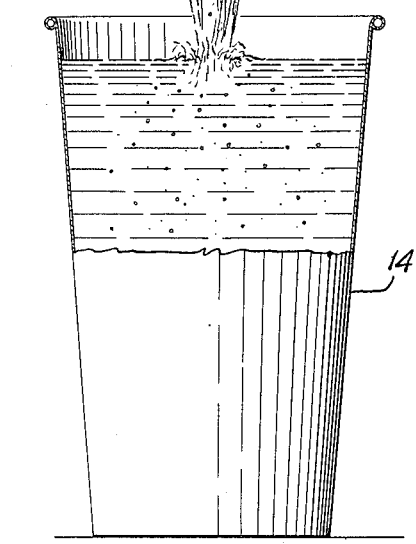
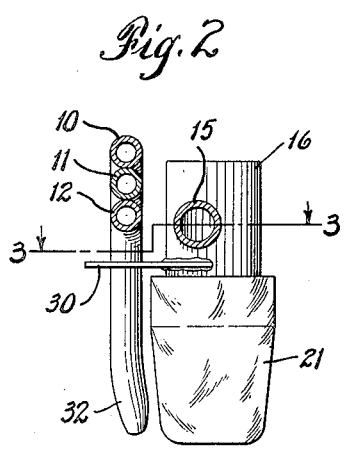
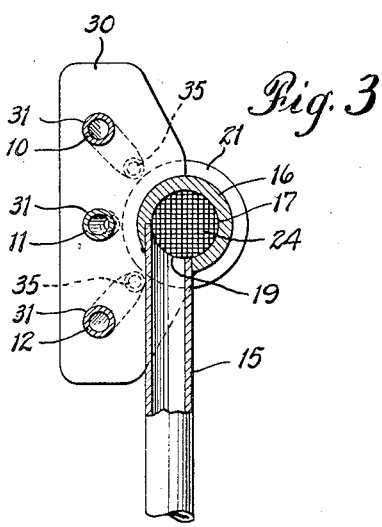
INVENTOR.
REGIS E. PARKS
BY
Morgan, Finnegan & Durham
ATTORNEYS.

Patented May 8, 1951

2,551,699

UNITED STATES PATENT OFFICE 2,551,699

BEVERAGE MIXING DEVICE

Regis E. Parks, Brooklyn, N. Y., assignor to Spacarb, Inc., New York, N. Y., a corporation of Delaware Application December 31, 1947, Serial No. 794,984

13 Claims. (Cl. 259—4)

1

The present invention relates to a beverage mixing device, and is particularly adapted to the mixing of carbonated water and flavored liquids in the dispensing of soft drinks.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate an embodiment of the invention, and together with the description, serve to explain the principles of the invention.

Of the drawings:

Fig. 1 is a view partly in side elevation and partly in vertical section of a typical and illustrative embodiment of the invention;

Fig. 2 is a view partly in section and partly in elevation taken along line 2—2 of Fig. 1; and Fig. 3 is a cross-sectional view taken along line 3—3 of Fig. 2.

The present invention has for an object the provision of an improved beverage mixing device and one which is particularly adaptable to the mixing and dispensing of soft drinks such as, for instance, in the mixing of carbonated water and syrups prior to delivery in a cup or otherwise to a customer. Another object is the provision of a carbonated beverage mixing device which preserves to the maximum the carbonation of water in the mixed drink, thus providing for the delivery of a sharp and tangy drink as against a flat one in which a large amount of the carbonation has escaped from the drink. Still another object is the provision of a relatively simple and economical mixing device, and one which is easy to disassemble and clean and to reassemble. The invention further provides a beverage mixing device which is sanitary and free of self-contamination, which feature renders the invention particularly adaptable to use with multiple flavor drink vending, preventing the unintentional mixing of flavors in a single drink.

Although of wide general application, the beverage mixing device or assembly of the present invention will be found to be particularly valuable when used with automatic soft drink vending machines such as are presently finding wide

2 public use. Such drink vending machines are ordinarily provided with means for automatically dispensing carbonated water and flavored syrup in measured amounts mixed as a carbonated beverage upon actuation of the machine by a customer or operator, and they are frequently constructed so as to dispense two or more flavors of drinks, or combinations of them.

The illustrative embodiment of the invention herein shown and described by way of example is adapted to use with such automatic soft drink vending machines. Referring in detail to the drawings herein, a three flavor drink mixing device or head is shown wherein syrup is delivered in measured quantities under pressure from other portions of an automatic mechanism (not shown) to the syrup tubes 10, 11 and 12 for mixture with refrigerated carbonated water also delivered under pressure in measured quantities to a water tube 13. Syrup from one or more of the tubes 10, 11 and 12 is mixed by means of the device of the invention with carbonated water from tube 13 in a descending stream and delivered, for example, in a cup 14 positioned beneath the device.

The carbonated water tube 13 leading from a carbonation apparatus or reservoir leads into an inlet tube 15 of somewhat larger diameter than tube 13, and the inlet tube 15 in turn conducts the water to a head member 16 having a cylindrical bore 17 and lower open end indicated by the numeral 18. The bore 17 of the head member 16 is, as shown, of substantially greater diameter than the inlet tube 15, and the latter enters the former through a port 19 in which the end of tube 15 is fixed. As best shown in Fig. 3 of the drawings, port 19 is so arranged in head member 16 that carbonated water entering from the tube 15 is not projected across the bore 17 to engage the opposite wall and continue in a turbulent flow, but is tangentially delivered within the bore 17 so that further flow of the water is in a swirling or spiral path around and down the wall of bore 17 toward the open end 18. For this purpose, the port 19 is eccentrically arranged with respect to the head 16, so that the radially outermost components of the water stream entering bore 17 do so substantially along a tangent to said bore.

The lower end of the head member 16 is externally threaded as indicated at 20 to receive a nozzle member 21, the upper end of the bore 22 of which is correspondingly threaded. The nozzle member 21 may, if desired, be made of a plastic or similarly translucent or transparent material.

A shoulder 23 is provided in the bore 22 of the nozzle member which serves as a seat for a circular screen element 24 or other means for counteracting or lessening the spiral swirl of carbonated water as it travels through the nozzle member. It will be noted that the nozzle 21 may be conveniently unscrewed from the head 16 and inverted to take out screen element 24 in order to clean the parts.

The bore 22 of nozzle member 21 is reduced and frusto-conically shaped at 25 in its portion below the shoulder 23 and adjacent the outlet end thereof, forming an integral and converging stream of carbonated water as indicated at 26 for mixture with syrup and delivery into the cup 14. With the construction for the carbonated water transmission and discharge system shown and described it will be apparent that the minimum of carbonation is lost prior to mixing with the syrup to form the beverage. The velocity of the water stream becomes progressively less as it passes from more restricted to less restricted conduits, passing from tube 13 into inlet tube 15, from there into the head member 16 and thence into the nozzle member 21. Moreover, the water, at reduced velocity, proceeds into and through the head member 16 and into the nozzle 21 in a spiral path with a minimum of turbulence, and consequently little loss of carbonation. The discharge of water in such a path would, however, be troublesome in mixing with the syrup and falling into the cup 14, so that means in the form of screen element 24 and reduced portion 25 of the nozzle are utilized to reduce or remove the spiral pattern or flow and focus and integrate the stream immediately before delivery.

A plate member 30 secured to any stationary portion of a drink machine or other framework may conveniently comprise the mounting for the presently described mixing device. The plate member is provided with an arcuate relieved place to receive the head member 16 and the latter is firmly secured thereto as by welding. A plurality of apertures 31 are provided around the head member 16 through respective ones of which the syrup tubes 10, 11 and 12 are passed. Said tubes are arranged about the nozzle member 21 and are slightly turned at their end portions 32 inwardly toward the axis of the nozzle, so that the streams 33 therefrom are directed toward the carbonated water stream 26 and adapted to meet and mix therewith beneath the nozzle 21. The ends 32 may be adjusted so that the streams 33 will meet and intermix with water stream 26 at any desired place, but it has been found desirable to arrange the streams so that they meet at a point at least as high as, or higher than, the upper surface of the completed, automatically dispensed drink, as shown in Fig. 1 of the drawings. Thus mixing always takes place within the descending stream before the bottom of the cup or the drink therein is reached, providing a better mixture than if turbulence in the cup or drink alone were relied upon.

The outlet ends 35 of the syrup tubes 10, 11 and 12 are preferably reduced to focus and integrate the streams therefrom. It will be apparent from the arrangement shown and described that the mixture of syrup and water takes place at all times outside of the water dispensing nozzle 21 so that there can never be any syrup contamination thereof. Thus a drink flavor delivered from tube 10, for instance, can never be intermixed with a drink flavor immediately subsequently delivered from tube 11, for instance and, moreover, any dripping or seepage from one or more of the syrup tubes between the dispensing of drinks will not affect a subsequently mixed drink.

The invention in its broader aspects is not limited to the specific mechanism shown and described but departures may be made therefrom, within the scope of the accompanying claims, without departing from the principles of the invention and without sacrificing its chief advantages.

What I claim is:

1. A beverage mixing device comprising, in combination, an internally bored water outlet member, a water conduit communicating with the bore of said member through a lateral wall thereof, a portion of a wall of said conduit constituting a tangent to the lateral wall of said bore, and a syrup outlet member, said members being arranged adjacent each other and with their outlet ends so directed that the streams therefrom will intersect beyond the confines of either of said members.

2. A beverage mixing device comprising, in combination, a downwardly directed carbonated water conduit, an inlead conduit communicating through a side wall of said water conduit, the bores of said conduits being eccentrically arranged with respect to each other and a plurality of syrup conduits adjacent and arranged to have outlets distributed about the outlet of said water conduit, said syrup conduits having their outlets inclined to direct syrup toward the stream from the water conduit outlet whereby the streams from said water conduit and any said syrup conduit will converge beyond the confines of any of said conduits.

3. A beverage mixing device comprising, in combination, a downwardly directed carbonated water conduit, a plurality of syrup conduits adjacent and arranged to have outlets distributed about the outlet of said water conduits and a plate element to which said conduits are secured, said syrup conduits having their outlets inclined to direct syrup toward the stream from the water conduit outlet.

4. A beverage mixing device comprising, in combination an internally bored carbonated water head element, a water conduit communicating with said head element through a lateral wall of said bore eccentrically arranged with respect to the bore thereof, a water supply conduit of lesser internal diameter than said first conduit communicating therewith, and a syrup conduit arranged to discharge a stream of liquid intersecting the stream from said head element beyond the confines of said element and syrup conduit.

5. A beverage mixing device comprising, in combination, an internally bored carbonated water head element, a water conduit communicating with said head element through a lateral wall of said bore eccentrically arranged with respect to the bore thereof, a water supply conduit of lesser internal diameter than said first conduit communicating therewith, means for counteracting water swirl within said head element, and a syrup conduit arranged to discharge a stream of liquid intersecting the stream from said head element beyond the confines of said element and syrup conduit.

6. A beverage mixing device comprising, in combination, an internally bored downwardly directed water outlet member, a water conduit communicating with the bore of said member having an internal bore of smaller diameter than said outlet member, and a downwardly directed syrup outlet member arranged adjacent said water outlet member said syrup member having an internal bore substantially smaller than said water outlet member, said outlet members having their outlet ends so directed that streams therefrom will intersect beyond the confines of either of said members.

7. A beverage mixing device as set forth in claim 6 wherein said water conduit communicates with the bore of said water outlet member through a lateral wall thereof and is eccentrically arranged with respect to the bore of said water outlet member.

8. A beverage mixing device as set forth in claim 6 wherein said water conduit communicates with the bore of said water outlet member through a lateral wall thereof and is eccentrically arranged with respect to the bore of said water outlet member, and means are positioned in the bore of said water outlet member remote from said water conduit for counteracting water swirl within said water outlet member.

9. A beverage mixing device comprising, in combination, an internally bored water outlet member, a water conduit communicating with the bore of said member through a lateral wall of said bore eccentrically arranged with respect to the bore thereof, and a syrup outlet member, said members being arranged adjacent each other and with their outlet ends so directed that the streams therefrom will intersect beyond the confines of either of said members.

10. A beverage mixing device comprising, in combination, an internally bored carbonated water head element, a water conduit communicating with said head element through a lateral wall of said bore eccentrically arranged with respect to the bore thereof, means for counteracting swirl within said head element, and a syrup conduit arranged to discharge a stream of liquid intersecting the stream from said head element beyond the confines of said element and said conduit.

11. A beverage mixing device comprising, in combination, an internally bored carbonated water head element, a water conduit communicating with said head element through a lateral wall of said bore eccentrically arranged with respect to the bore thereof, means for counteracting swirl within said head element said means comprising a screen positioned in the bore of said head element spaced from the inlet thereto of said water conduit, and a syrup conduit arranged to discharge a stream of liquid intersecting the stream from said head element beyond the confines of said element and said conduit.

12. A beverage mixing device comprising, in combination, an internally bored water outlet member, a water conduit communicating with the bore of said member through a lateral wall of said bore eccentrically arranged with respect to the bore thereof, a syrup outlet member, a nozzle member removably secured to an end of said outlet member, and means in said nozzle member for counteracting water swirl within said nozzle member, said syrup and nozzle members being arranged adjacent each other and with their outlet ends so directed that the streams therefrom will intersect beyond the confines of either of said members.

13. A beverage mixing device comprising, in combination, an internally bored water outlet member, a water conduit communicating with the bore of said member through a lateral wall of said bore eccentrically arranged with respect to the bore thereof, a syrup outlet member, and a nozzle member having a bore with a frustoconically shaped outlet end said nozzle member being removably secured to said outlet member.

REGIS E. PARKS.

REFERENCES CITED

The following references are of record in the file of this patent:

UNITED STATES PATENTS

| Number | Name | Date |
| --- | --- | --- |
| 520,222 | Rodin | May 22, 1894 |
| 1,000,641 | Tebbit | Aug. 15, 1911 |
| 1,115,518 | Dwiggins | Nov. 3, 1914 |
| 1,293,108 | Judson | Feb. 4, 1919 |
| 1,842,877 | Muller et al. | Jan. 26, 1932 |
| 2,125,245 | McCray | July 26, 1938 |
| 2,391,003 | Bowman | Dec. 18, 1945 |

FOREIGN PATENTS

| Number | Country | Date |
| --- | --- | --- |
| 666,515 | Germany | Oct. 21, 1938 |